United States Patent Office 3,442,346
Patented May 6, 1969

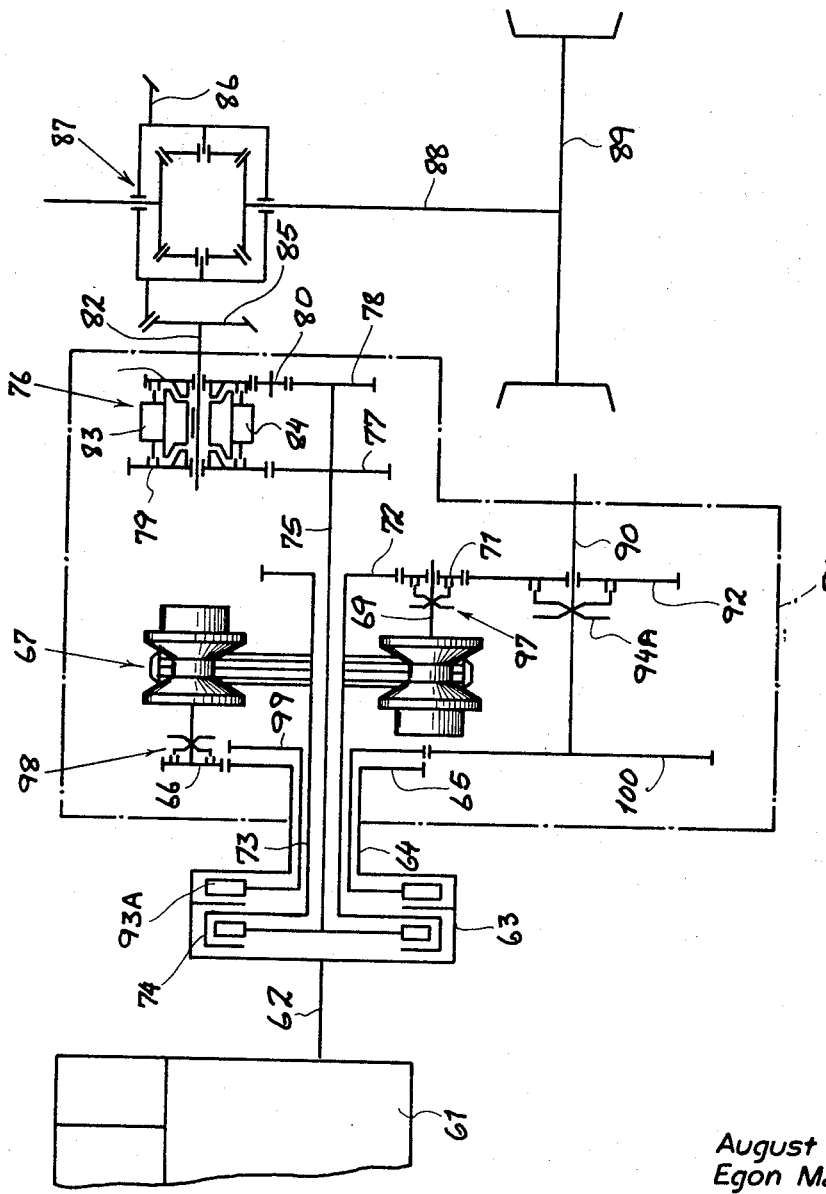

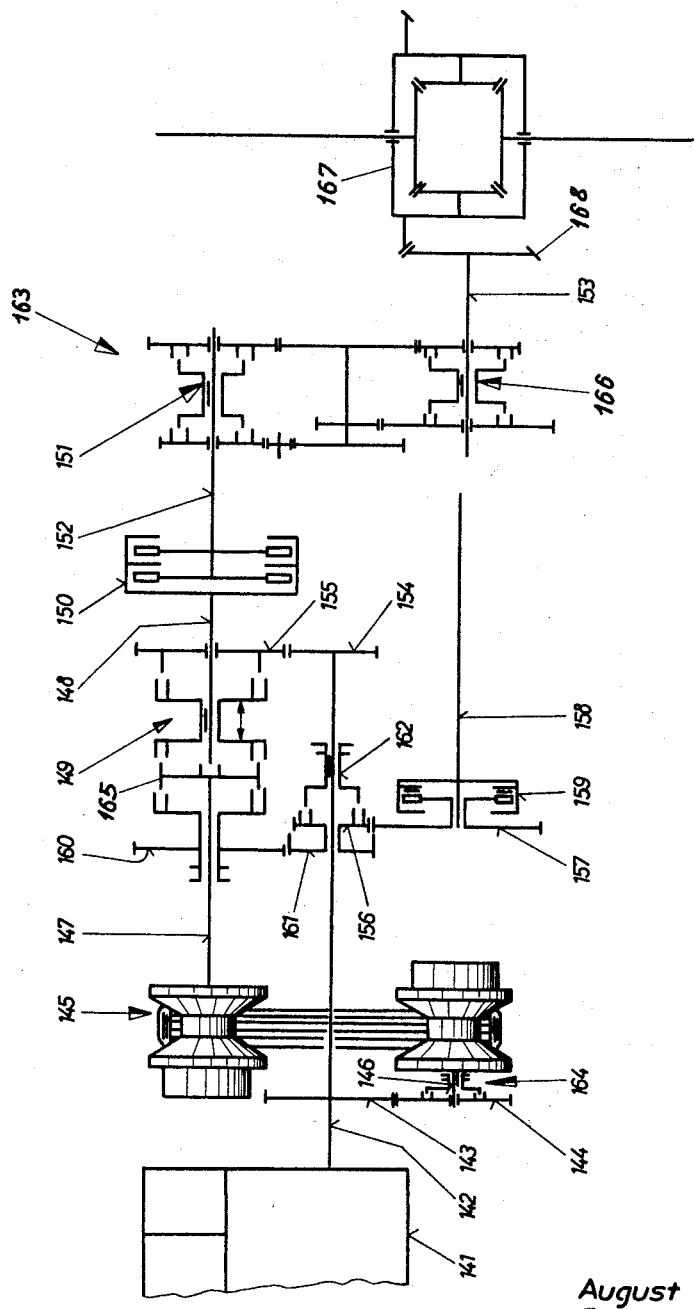

3,442,346
VEHICLE TRANSMISSION SYSTEM AND POWER TAKE-OFF
August Winter and Egon Mann, Friedrichshafen, Germany, assignors to Zahnradfabrik Friedrichshafen Aktiengesellschaft, Friedrichshafen, Germany, a corporation of Germany
Filed Feb. 16, 1967, Ser. No. 616,598
Claims priority, application Germany, Feb. 22, 1966, Z 12,046
Int. Cl. B60k 17/28, 17/04
U.S. Cl. 180—53
11 Claims

ABSTRACT OF THE DISCLOSURE

Transmission system for a wheeled vehicle (e.g. an agricultural tractor) with one or more driven wheel axles and, preferably, a power-take-off shaft, the system including a stepless speed changer (e.g. variable-ratio-chain-and-pulley drive or hydrostatic transmission) and a shiftable gear assembly for further speed changes and/or speed reversals whereby the wheel axle or axles can be normally driven from the drive shaft of the vehicular engine through the stepless speed changer and the shiftable gear assembly upon the engagement of a first clutch therebetween; a second clutch, engageable in the disengaged state of the first clutch, serves to establish a power train from the engine to the driven axle or axles which may include all or part of the shiftable gear assembly but which bypasses the stepless speed changer, the power-take-off shaft being also actuatable directly from the drive shaft of the engine independently of the stepless speed changer. The power train bypassing that speed changer may include all or part of the coupling linking the drive shaft with the power-take-off shaft, with the latter selectively operable directly from the drive shaft or from the output of the stepless speed changer whereby the power-take-off shaft can be selectively rotated at a speed varying with that of the vehicle or a speed (constant or variable) independent of vehicular speed.

---

Our present invention relates to a vehicular transmission system as used, for example, in agricultural tractors or other heavy-duty road vehicles.

In such vehicles it is often desirable to provide several speed ranges and to allow for continuous variation of speed ratio within each of these ranges. This is conveniently accomplished by the cascading of a conventional stepless speed changer, e.g. a variable-ratio-chain-and-pulley drive or hydrostatic transmission, and a shiftable gear assembly which generally is also used for the reversal of vehicular motion.

The commonly available stepless speed changer are, however, not as sturdy as the stepped transmissions with shiftable gear trains so that, in practice, a breakdown of the stepless speed changer under severe load conditions is not unusual. Also, situations may arise where it is prudent or imperative to connect the driving engine of the vehicle with its driven wheel axle or axles through a more positively acting power train independent of the variable-ratio-chain-and-pulley drive or hydrostatic transmission serving as a stepless speed changer.

It is, therefore, the general object of our present invention to provide means in such vehicles for optionally establishing a power train from the engine drive shaft to the wheel axle or axles which bypasses the stepless speed changer.

This object is realized, pursuant to a feature of our invention, by the provision of several independently and alternately engageable clutches or sets of clutches, specifically a first clutch between the output shaft of the stepless speed changer and the input shaft of the shiftable gear assembly, and a second clutch which in its engaged state connects the drive shaft of the vehicular engine with the driven axle or axles via a power train bypassing the stepless speed changer. The bypassing power train may include all or part of the shiftable gear assembly, especially a speed-reversing stage thereof which may or may not be preceded by one or more ratio-changing stages; it is, however, also possible to include separate speed-reversing means in this power train which can then be connected directly to the output shaft of the shiftable gear assembly coupled to the driven wheel axle or axles of the vehicle.

If the vehicle is equipped with a power-take-off shaft, as will usually be the case in an agricultural tractor, the power train bypassing the stepless speed changer may include all or part of the coupling which connects this power-take-off shaft with the drive shaft of the engine.

In a vehicle comprising such power-take-off shaft it is frequently desirable to have the possibility of choosing between different modes of torque transmission to that shaft whereby the latter can be driven either at a substantially constant speed directly from the engine of the moving vehicle (e.g. to operate a harvester), at a speed varying with that of the vehicle (e.g. to drive the axle of a semitrailer or to actuate a crop-gathering implement), or at a manually variable speed during standstill of the vehicle (e.g. to operate a power source for the cutting of timbers in a forest). Thus, it is a more particular object of our invention to provide a highly versatile vehicle of the above character combining these different modes of driving a power-take-off shaft with the aforedescribed feature of optional wheel drive independent of a stepless speed changer normally utilized.

The object just stated is realized, pursuant to a more particular feature of our invention, by the interposition of a clutch member between the power-take-off shaft and the bypassing power train whereby, in the engaged state of the first clutch and the disengaged state of the second clutch, the power-take-off shaft can be connected with the output of the stepless speed changer for rotation thereby. On being so connected, the power-take-off shaft will rotate at a speed which varies with that of the vehicle if the wheels of the latter are also driven from the stepless speed changer; otherwise, i.e. upon use of the bypassing power train or with the wheels decoupled during standstill of the vehicle, the speed of the power-take-off shaft will be independently adjustable.

It is also an object of our invention to provide a highly compact transmission system of the versatile type outlined above, requiring only a minimum of space for elements other than those conventionally included in such systems.

The last-mentioned object is attained, in accordance with still another specific feature of the invention, by making the input shaft of the shiftable gear assembly tubular and extending this shaft forwardly past the stepless speed changer toward the drive shaft of the engine, the interior of this tubular shaft accommodating one or more intermediate shafts disposed coaxially therewith for selective coupling with that input shaft through another clutch—preferably one of the dry friction type—located between the engine and a housing occupied by the stepless speed changer and the shiftable gear assembly. Advantageously, this friction clutch and the aforementioned second clutch (whose engagement establishes the bypassing power train) are arranged next to each other in a common drum which forms part of the torque-transmitting connection from the drive shaft to the input of the stepless speed changer.

The invention will be described hereinafter in greater detail with reference to the accompanying drawing in which:

FIG. 2A illustrates a modification of the embodiment of FIG. 2;

FIG. 4 is an overall view similar to FIG. 1, illustrating a fourth embodiment.

Figure 1:
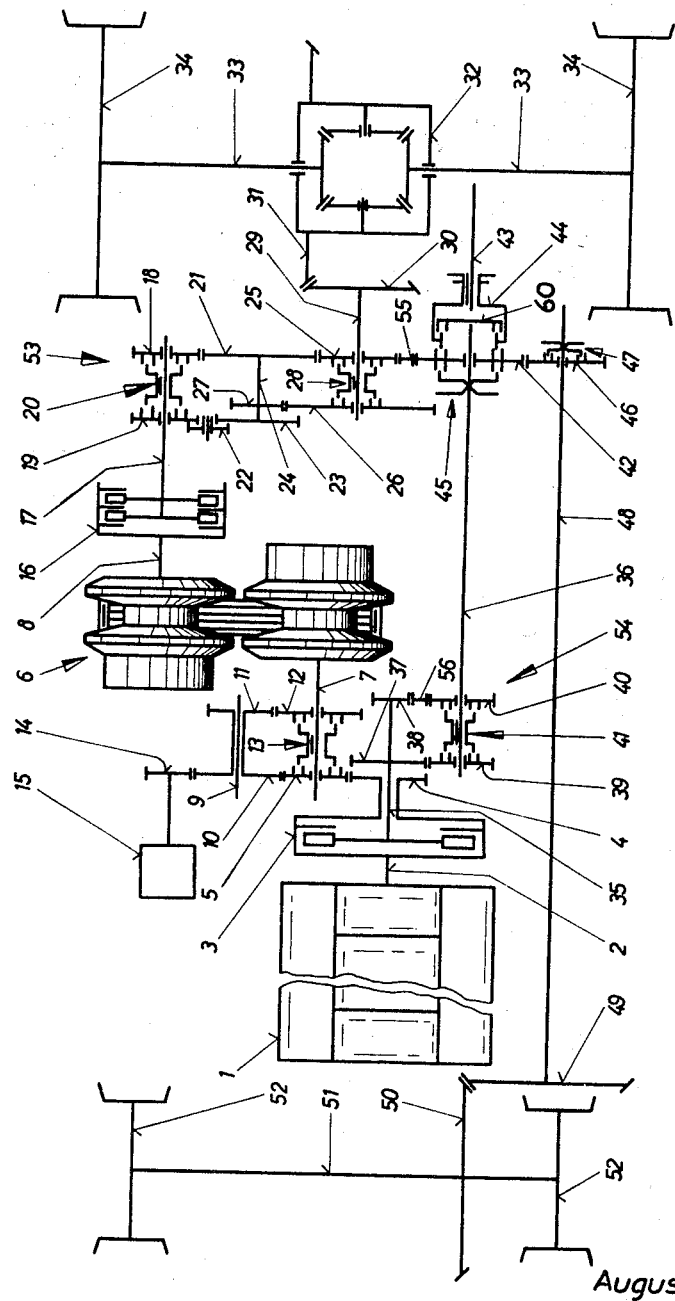
FIG. 1 is a diagrammatic view of a vehicular transmission system representing a first embodiment of the invention.

In FIG. 1 we have shown a transmission system for a four-wheel vehicle, such as an agricultural tractor, having an engine 1, a pair of front wheels 52 with an axle 51, and a pair of rear wheels 34 whose respective half-axes 33 are interconnected in the conventional manner by a differential 32.

Engine 1 powers a drive shaft 2 which is rigid with the housing of a drum-type clutch 3 of the dry friction type; this clutch housing, in turn, is integral with a spur gear 4 freely traversed by a shaft 35 which can be coupled to drive shaft 2 upon the engagement of clutch 3. Gear 4 meshes with another spur gear 5 idling on the input shaft 7 of a stepless speed changer 6, here shown to be of the type known as a variable-ratio-chain-and-pulley drive, consisting essentially of two split pulleys interconnected by an endless chain, the axial spacing of the two halves of both pulleys being complementarily variable to alter the speed ratio between input shaft 7 and an output shaft 8.

Gear 5 meshes with a gear 10 which is rigid with another, smaller gear 11 in engagement with a larger gear 12 also rotatably mounted on shaft 7. Gear 10, supported along with gear 11 on an auxiliary shaft 9, is also in mesh with a pinion 14 on an input shaft of an ancilliary device, 15, such as an oil pump or an electric generator, the latter being thus driven continuously and directly from the engine 1.

A clutch 13, keyed to shaft 7, is alternately engageable with respective jaws on gears 5 and 12 for positively coupling one or the other of these gears with the input of speed changer 6. If clutch 13 is shifted to the left, shaft 7 is driven directly and at relatively high speed from shaft 2 by way of gears 4 and 5; if the clutch is shifted to the right, shaft 7 is rotated at a relatively low or "creep" speed via gears 4, 5, 10, 11 and 12. In the illustrated intermediate or disengaged position of clutch 13, shaft 7 is decoupled from engine 1 and the speed changer 6 is idle.

Another dry friction clutch 16 is engageable to connect the output shaft 8 of stepless speed changer 6 with the input shaft 17 of a shiftable gear assembly 53 which comprises a pair of gears 18, 19 loosely mounted on this shaft for selective coupling therewith upon the shifting of a jaw clutch 20, keyed to shaft 17, to either the right or the left. Gear 18 meshes with a gear 21 which, along with two further gears 23 and 27, is keyed to a shaft 24; gear 19 engages the gear 23 through the intermediary of a reversing gear 22. Two further gears 25 and 26, respectively in mesh with gears 21 and 27, are loosely supported on the output shaft 29 of gear train 53 to which a jaw clutch 28 is keyed for alternate engagement with gears 25 and 26; in the illustrated intermediate position of clutch 28, both these gears are free to rotate on shaft 29 which is connected through a bevel gear 30 with the ring gear 31 of differential 32.

Thus, upon a shifting of both clutches 20 and 28 to the right, a driving connection of relatively high speed ratio is established from input shaft 17 to output shaft 29 by way of gears 18, 21 and 25. If clutch 28 is shifted to the left, gears 26 and 27 are made effective instead of gear 25 whereby the speed ratio is lowered without a change in the sense of rotation of shaft 29 which in this position of clutch 20 is assumed to rotate the rear wheels 34 in the forward direction. If clutch 20 is shifted to the left, shaft 29 and therefore wheels 34 are driven in reverse at a speed dependent upon the position of clutch 28.

Front axle 51 carries a bevel gear 50 in mesh with another bevel gear 49 on a transmission shaft 48. A gear 46, idling on shaft 48 and positively connectable therewith by a jaw clutch 47, is in mesh with another gear 42 engaging the gear 25 through the intermediary of a reversing gear 55. The rotation of gear 21 is thus transmitted to shaft 48 and, thereby, to the front wheels 52 by way of gears 25, 55, 42 and 46. With clutch 28 in its right-hand position, wheels 34 and 52 turn at like peripheral speeds in a direction determined by the position of clutch 20. With clutch 28 in neutral while clutch 47 remains engaged, only the front wheels 52 are driven. Suitable interlocking means, not shown, may be provided for preventing a shifting of clutch 28 to the left in the engaged position of clutch 47 so as to avoid the possibility of the two pairs of wheels rotating at mutually different speeds.

Gear 42 is loosely mounted on an auxiliary shaft 36 with which it may be positively coupled by means of a normally disengaged jaw clutch 45; shaft 36 rotatably supports a pair of gears 39, 40 which can be selectively coupled therewith by a shiftable jaw clutch 41 and which are in respective engagement with two gears 37 and 38 keyed to shaft 35, a reversing gear 56 being inserted between gears 38 and 40. Reversing clutch 41 forms part of a coupling 54 by which the drive shaft 2, in the engaged condition of friction clutch 3, may be operatively connected with shaft 36; another clutch 44 is keyed to a power-take-off shaft 4 and, when shifted to the right, engages a disk 60 rigid with shaft 36 for transmitting the torque of the latter shaft to power-take-off shaft 43. Clutch 44 may also be shifted to the left to engage coupling formations on gear 42 whereby power-take-off shaft 43 is driven from input shaft 17 via gear train 53 if clutches 13, 16 and 20 are engaged and clutch 3 and/or clutch 45 is inactive; interlocking means may again be provided to prevent concurrent engagement of all five clutches 3, 13, 16, 20 and 45 which would subject the gear train 53 to simultaneous driving torques at different speeds via speed changer 6 and coupling 54.

If clutch 16 is disengaged and clutches 3 and 45 are engaged, a power train for the operation of gear assembly 53 may be traced from engine 1 via shafts 2, 35 and 36 whereby the power of the engine may be transmitted directly to output shaft 29 over a path independent of speed changer 6. Under these conditions, with clutch 28 engaged in either its right-hand or its left-hand position, the wheels 34 and/or the wheels 52 will be positively driven (except for possible slippage at clutch 3) while the power-take-off shaft 43 may or may not be operated as determined by the position of clutch 44. If the vehicle is at standstill with clutch 28 in neutral, shaft 43 (with clutch 44 in its left-hand position) may be driven at variable speed via speed changer 6 or at constant speed via coupling 54, depending on whether clutches 16, 20 or 3, 41, 45 are actuated. Clutch 13 may be assumed to be normally in its left-hand engaged position and to be moved into neutral only under special circumstances, e.g. during starting in cold weather in order to relieve the starter motor (not shown) of the load of stepless speed changer 6.

Figure 2:
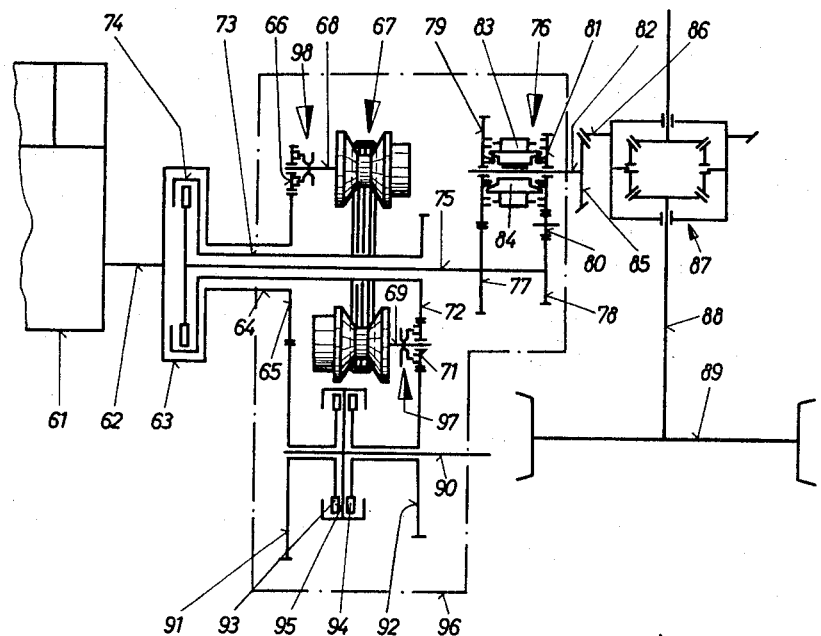
FIG. 2 is a diagrammatic view of part of a transmission system generally similar to that of FIG. 1 but representing a second embodiment.

In FIG. 2, we show part of another transmission system according to our invention connected between the drive shaft 62 of an engine 61 and the differential drive 85–87 for the half-axles 88 of rear wheels 89 (only one shown). There is again provided a stepless speed changer 67 and a shiftable gear assembly 76, the latter driving the bevel gear 85 through an output shaft 82; it is to be understood that, in this and subsequent embodiments, the torque of the shiftable gear assembly may also be selectively applied to a front-wheel axle as described in connection with the system of FIG. 1.

A common housing 96, indicated in dot-dash outline, surrounds the cascaded transmissions 67, 76 and also encloses a pair of friction clutches 93, 94 co-operating with a disk 95 rigid with a power-take-off shaft 90. The latter may thus be driven either from the output shaft 69 of speed changer 67, through the intermediary of clutches 94, 97 and meshing gears 71, 92, or from drive shaft 62 via a clutch drum 63 rigid therewith and meshing gears 65, 91 as well as clutch 93. Gear 65, provided with a tubular boss 64 which is rigid with drum 63, also meshes with a pinion 66 idling on the input shaft 68 of speed changer 67 but normally held in positive engagement with that shaft by a clutch 98.

The input shaft 73 of gear assembly 76 carries a gear 72 keyed thereto and meshing with gear 71 so as to be positively connectable with output shaft 69 of speed changer 67 in the engaged condition of clutch 97. Shaft 73 is tubular and coaxially nested within boss 64, extending therein forwardly toward shaft 62 and terminating within drum 63 in a friction clutch 74 which, when engaged, couples this shaft with an intermediate shaft 75 carrying a pair of gears 77, 78 keyed thereto. The latter gears drive a pair of gears 79 and 81, respectively, which are loose on the output shaft 82 of assembly 76, a reversing gear 80 being inserted between gears 78 and 81. A jaw clutch 83 keyed to shaft 82 is alternately engageable with gears 79 and 81 on being shifted to the left or to the right from its illustrated neutral position. In order to facilitate the engagement of this clutch with either of the associated gears during movement of the vehicle, a speed synchronizer 84 is connected with clutch 83 for joint axial displacement therewith.

In the normal operation of the system of FIG. 2, with clutch 98 engaged, motion is imparted to the vehicle by engagement of clutches 97 and 74 to establish a driving connection from shaft 62 to differential 87 and/or to the front-wheel axle of the vehicle, the sense of rotation of the assembly 82–89 depending upon the engaged position of clutch 83. (If the front wheels are to be driven from gear 77 or 78 independently of shaft 82, a separate reversing clutch may have to be provided therefor.) Engagement of clutch 94 or 93 turns the power-take-off shaft 90 either at a variable rate, thus in step with the vehicle if clutches 74 and 83 are also closed, or at substantially constant speed under direct control of engine 61. Concurrent engagement of clutches 93 and 94 as well as 74, with clutch 97 open, establishes a power train independent of speed changer 67 from drive shaft 62 to intermediate shaft 75 and thence, upon closure of clutch 83, to output shaft 82 and differential 87; this power train includes the power-take-off shaft 90 which thus rotates in step with shafts 62 and 75.

In the modification of the above system shown in FIG. 2A, clutch 93 has been replaced by a friction clutch 93A located within drum 63 alongside clutch 74. Clutch 93A, when engaged, couples the drive shaft 62 with a gear 99 engaging a gear 100 rigid on power-take-off shaft 90 onto which a jaw clutch 94A is keyed for engagement with gear 92. The operation of the clutches 93A and 94A has the same effect as that of the clutches 93 and 94 in FIG. 2.

Figure 3:
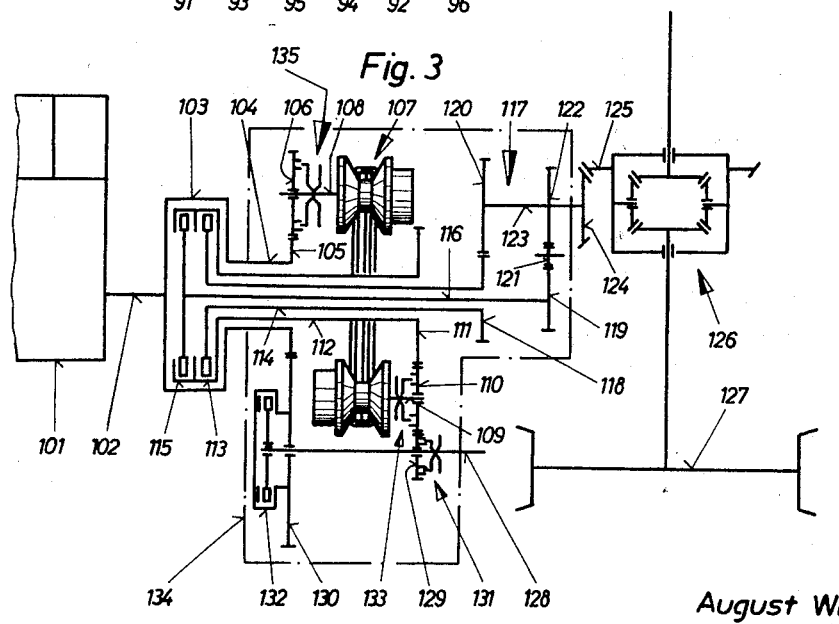
FIG. 3 is a partial view similar to FIGS. 2 and 2A, representing a third embodiment.

The transmission system of FIG. 3 is similar to that of FIGS. 2 and 2A in that the output shaft 109 of a stepless speed changer 107 is connectable via a clutch 133 and meshing gears 110, 111 with a tubular input shaft 112 of a gear train 117, the tubular shaft 112 extending forwardly through a transmission housing 134 into a drum 103 which is located between housing 134 and engine 101 and which is rigid with the drive shaft 102 of that engine. Drum 103 is integral with the tubular hub 104 of a gear 105 meshing with a gear 106 which is normally in positive engagement, through a jaw clutch 135, with the input shaft 108 of the speed changer 107 on which the gear 106 is mounted. Gear 105 also meshes with a gear 130 which, by means of a friction clutch 132, can be made rigid with a power-take-off shaft 128; the latter carries a gear 129 entrainable by it upon engagement of a clutch 131, gear 129 being in mesh with gear 110 to drive the tubular input shaft 112 directly from the engine, upon closure of clutches 131, 132 and opening of clutch 133, independently of speed changer 107.

Drum 103 houses a pair of juxtaposed friction clutches 113, 115 serving for the reversible entrainment of gear assembly 117 by means of respective intermediate shafts 114, 116 coaxially nested within shaft 112. Tubular shaft 114 has keyed to it a gear 118 meshing with a gear 120 which is rigid on the output shaft 123 of the gear assembly 117, this output shaft being again coupled by way of bevel gears 124, 125 and a differential 126 with the rear wheels 127 (only one shown) of the vehicle. Central shaft 116 similarly carries a gear 119 which, through a reversing gear 121, engages a gear 122 likewise rigid with output shaft 123. In the system of FIG. 3, therefore, the reversing function performed in the preceding embodiment by clutch 83 is carried out by the clutch assembly within drum 103.

In FIG. 4, finally, we have shown an embodiment wherein the drive shaft 142 powered by engine 141 is directly connectable with a shiftable gear assembly 163 without involving the associated power-take-off shaft 158 in this connection. Keyed to drive shaft 142 are a first gear 143 meshing with a gear 144 on the input shaft 146 of a stepless speed changer 145 with which it may be solidified by a jaw clutch 164; a second gear 154 meshing with a gear 155 which is loosely mounted on the input shaft 148 of gear assembly 163; and a jaw clutch 162 engageable with one element 156 of a dual gear 156, 161 loosely mounted on shaft 142. Gear 156 is in mesh with a gear 157 which which can be operatively connected with power-take-off shaft 158 by engagement of a friction clutch 159; gear 161 meshes with a gear 160 which is rotatably and axially slidable on the output shaft 147 of speed changer 145 for selective engagement with a disk 165, rigid with shaft 147. A double clutch 149 on shaft 148 is axially shiftable thereon, from its illustrated neutral position, into alternate engagement with disk 165 or gear 155 to link the shaft 148 with drive shaft 142 either via speed changer 145 or directly by way of gear 154. Shaft 148, in turn, is connectable with an intermediate shaft 152 of gear assembly 163 through engagement of a friction clutch 150; shaft 152 drives the wheels (not shown) of the vehicle through a transmission which is generally similar to that of FIG. 1 and includes a reversing clutch 151, a speed-changing clutch 166 and a differential 167 driven from a bevel gear 168 on an output shaft 153.

With clutch 164 engaged, a rightward shift of gear 160 will impart motion to gears 161, 156 (it being understood that clutch 162 must be disengaged under these circumstances) by way of speed changer 145 so that, with clutch 159 closed, power-take-off shaft 158 can be driven at adjustable speed in step with the movement of the vehicle or independently thereof, according to the condition of clutch 150 and the operative position of clutch 149. Thus, again, the power-take-off shaft is rotatable at substantially constant speed (directly from engine 141), at vehicular speed or at independently adjustable speed, whereas the wheel axles of the vehicle can be driven through the stepless speed changer 145 or by means of a power train 154, 155, 149 bypassing this speed changer.

Naturally, the several embodiments described hereinabove may be modified in various, respects, e.g. through combination or substitution of compatible features from different figures of the drawing.

We claim:

1. In a wheeled vehicle having at least one driven wheel axle and an engine provided with a drive shaft, the combination therewith of:

a stepless speed changer provided with a first input shaft and a first output shaft;

shiftable gear means provided with a second input shaft and a second output shaft;

first clutch means between said speed changer and said shiftable gear means engageable for connecting said first output shaft with said second input shaft; said shiftable gear means comprising a pair of reversing gears and selectively operable third clutch means included in said power train for effectively connecting either of said reversing gears between said second input and output shafts, said third clutch means including a coupling member keyed to said second output shaft, said reversing gears being loosely supported on said second output shaft for alternate engagement with said coupling member;

second clutch means engageable in the disengaged condition of said first clutch means for connecting said drive shaft with said shiftable gear means, thereby establishing a power train independent of said speed changer from said engine to said wheel axle, said power train including at least a final stage of said shiftable gear means;

first coupling means for connecting said second output shaft with said driven wheel axle;

and second coupling means for connecting said drive shaft with said first input shaft.

2. The combination defined in claim 1, further comprising a power-take-off shaft and further clutch means for selectively connecting said power-take-off shaft with said drive shaft and with said first output shaft.

3. The combination defined in claim 1 wherein said first clutch means includes a friction clutch.

4. In a wheeled vehicle having at least one driven wheel axle and an engine provided with a drive shaft, the combination therewith of:

a stepless speed changer provided with a first input shaft and a first output shaft;

shiftable gear means provided with a second input shaft and a second output shaft;

first clutch means between said speed changer and said shiftable gear means engageable for connecting said first output shaft with said second input shaft; said shiftable gear means comprising a pair of reversing gears and selectively operable third clutch means included in said power train for effectively connecting either of said reversing gears between said second input and output shafts;

second clutch means engageable in the disengaged condition of said first clutch means for connecting said drive shaft with said shiftable gear means, thereby establishing a power train independent of said speed changer from said engine to said wheel axle, said power train including at least a final stage of said shiftable gear means;

first coupling means for connecting said second output shaft with said driven wheel axle;

and second coupling means for connecting said drive shaft with said first input shaft; said first output shaft being tubular and extending past said speed changer towards said drive shaft, said shiftable gear means being provided with at least one intermediate shaft coaxially nested within said tubular shaft, said third clutch means including a clutch member engageable to interconnect the ends of said tubular and intermediate shafts proximate to said drive shaft.

5. The combination defined in claim 4 wherein said clutch member and said reversing gears are provided with mating clutch formations and with speed-synchronizing means for facilitating interengagement of said formations.

6. The combination defined in claim 4 wherein said second coupling means includes a drum rigid with said drive shaft and enveloping said clutch member, said speed changer and said shiftable gear means being provided with a common housing spaced from said engine, said drum being disposed between said engine and said housing.

7. The combination defined in claim 6 wherein said second clutch means comprises another clutch member disposed in said drum alongside the first-mentioned clutch member.

8. In a wheeled vehicle having at least one driven wheel axle, an engine provided with a drive shaft, and a power-take-off shaft, the combination therewith of:

a stepless speed changer provided with a first input shaft and a first output shaft;

shiftable gear means provided with a second input shaft and a second output shaft;

first coupling means for connecting said second output shaft with said driven wheel axle;

second coupling means for connecting said drive shaft with said first input shaft;

third coupling means independent of said speed changer for connecting said driven saft with said power-take-off shaft;

first clutch means between said speed changer and said shiftable gear means engageable for connecting said first output shaft with said second input shaft;

and second clutch means engageable in the disengaged condition of said first clutch means for connecting said third coupling means with said shiftable gear means, thereby establishing a power train independent of said speed changer from said drive shaft to said wheel axle; said third coupling means being provided with a clutch member interposed between said power-take-off shaft and an element of said power train whereby said power-take-off shaft is connectable, in the engaged state of said first clutch means and the disengaged state of said second clutch means, with the output of said stepless speed changer.

9. The combination defined in claim 8 wherein said element is a gear loosely mounted on said first output shaft, said first clutch means including a clutch member engageable to couple said gear with said first output shaft.

10. The combination defined in claim 8 wherein said second clutch means includes said clutch member and another clutch member between said power-take-off shaft and said drive shaft whereby said power train is completable via said power-take-off shaft upon concurrent engagement of said clutch members.

11. The combination defined in claim 10 wherein said other clutch member is a friction clutch.

References Cited

UNITED STATES PATENTS 2,691,901  10/1954  Maybach et al.

FOREIGN PATENTS 1,031,144  5/1958  Germany.
1,063,468  8/1959  Germany.

A. HARRY LEVY, *Primary Examiner.*

U.S. Cl. X.R

74—15.88, 722; 180—44, 70